US012780731B2

(12) United States Patent
Ben Hara et al.

(10) Patent No.: US 12,780,731 B2
(45) Date of Patent: Nov. 3, 2026

(54) PERFORMANCE ENHANCER FOR COMPOSITE CEMENTS

(71) Applicant: HSustainability GmbH, Heidelberg (DE)

(72) Inventors: Mohsen Ben Hara, Heidelberg (DE); Arnaud Muller, Heidelberg (DE); Maciej Zajac, Heidelberg (DE)

(73) Assignee: HSustainability GmbH, Heidelberg (DE)

( * ) Notice: Subject to any disclaimer, the term of this patent is extended or adjusted under 35 U.S.C. 154(b) by 299 days.

(21) Appl. No.: 18/564,193

(22) PCT Filed: Jun. 28, 2022

(86) PCT No.: PCT/EP2022/067660
§ 371 (c)(1),
(2) Date: Nov. 27, 2023

(87) PCT Pub. No.: WO2023/275007
PCT Pub. Date: Jan. 5, 2023

(65) Prior Publication Data

US 2024/0376004 A1 Nov. 14, 2024

(30) Foreign Application Priority Data

Jul. 1, 2021 (EP) .................................... 21183139

(51) Int. Cl.
*C04B 24/12* (2006.01)
*C04B 11/30* (2006.01)
(Continued)

(52) U.S. Cl.
CPC ............ *C04B 24/122* (2013.01); *C04B 11/30* (2013.01); *C04B 14/28* (2013.01); *C04B 22/147* (2013.01);
(Continued)

(58) Field of Classification Search
CPC ....... C04B 24/122; C04B 11/30; C04B 14/28; C04B 22/147; C04B 22/16; C04B 28/04;
(Continued)

(56) References Cited

U.S. PATENT DOCUMENTS 6,221,148 B1 4/2001 Mathur et al.
8,317,916 B1 11/2012 Dongell
(Continued)

FOREIGN PATENT DOCUMENTS

CA 2883816 A1 * 3/2014 ............ B01D 53/18
CN 103204646 A * 7/2013
(Continued)

OTHER PUBLICATIONS

CN103204646A Machine translation (Year: 2013).*
(Continued)

*Primary Examiner* — Pamela H Weiss
(74) *Attorney, Agent, or Firm* — Collard & Roe, P.C.

(57) ABSTRACT

Composition comprising a polyphosphate, an amine and an inorganic sulfate compound for enhancing the workability and/or the strength development of hydraulic binders comprising a cement and a high water demand supplementary cementitious material and/or a high water demand filler.

9 Claims, 1 Drawing Sheet

(51) Int. Cl.

*C04B 14/28* (2006.01)
*C04B 22/14* (2006.01)
*C04B 22/16* (2006.01)
*C04B 28/04* (2006.01)
*C04B 28/14* (2006.01)
*C04B 103/00* (2006.01)

(52) U.S. Cl.

CPC .............. *C04B 22/16* (2013.01); *C04B 28/04* (2013.01); *C04B 28/14* (2013.01); *C04B 2103/0088* (2013.01)

(58) Field of Classification Search

CPC ............ C04B 28/14; C04B 2103/0088; C04B 2103/52; C04B 28/02; C04B 40/0039; C04B 22/143; C04B 24/121; C04B 14/12; C04B 14/26; C04B 22/145; Y02W 30/91

See application file for complete search history.

(56) References Cited

U.S. PATENT DOCUMENTS

| | | | | |
|---|---|---|---|---|
| 10,766,818 | B2 | 9/2020 | Bullerjahn et al. | |
| 2008/0302276 | A1* | 12/2008 | Perez-Pena | C04B 28/04 106/690 |
| 2017/0267586 | A1 | 9/2017 | Bullerjahn et al. | |
| 2019/0144334 | A1 | 5/2019 | Berodier et al. | |
| 2019/0144339 | A1* | 5/2019 | Bullerjahn | C04B 7/13 106/695 |

FOREIGN PATENT DOCUMENTS

| | | | | |
|---|---|---|---|---|
| EP | 2 226 363 | A1 | 9/2010 | |
| EP | 3 248 952 | A1 | 11/2017 | |
| WO | WO-2015034531 | A1 * | 3/2015 | E21B 33/13 |
| WO | 2017/034547 | A1 | 3/2017 | |
| WO | 2018/228839 | A1 | 12/2018 | |
| WO | 2020/157775 | A1 | 8/2020 | |
| WO | 2021/105823 | A1 | 6/2021 | |

OTHER PUBLICATIONS

International Search Report in PCT/EP2022/067660, mailed Oct. 7, 2022.

European Search Report dated Dec. 20, 2021 in European Application No. 21183139.1.

International Preliminary Report on Patentability in PCT/EP2022/067660, mailed Oct. 10, 2023.

Y. Zhang et al., "Effect of Sodium Hexametaphosphate and Trisodium Phosphate on Dispersion of Polycarboxylate Superplasticizer", Materials 2019, 12, 4190; doi:10.3390/ma12244190, www.mdpi.com/journal/materials, total of 19 pages.

Prof. Dr. rer. nat. Friedrich W. Locher: Cement Fundamentals of Manufacture and Use; Bau + Technik (2000) (with English translation).

DIN Technical Committee for Construction (NABau): Methods of testing cement—Part 3: Determination of setting times and soundness (2016) (with English translation).

Elsevier: Lea's Chemistry of Cement and Concrete Fourth Edition Edited by Peter C. Hewlett (1998).

* cited by examiner

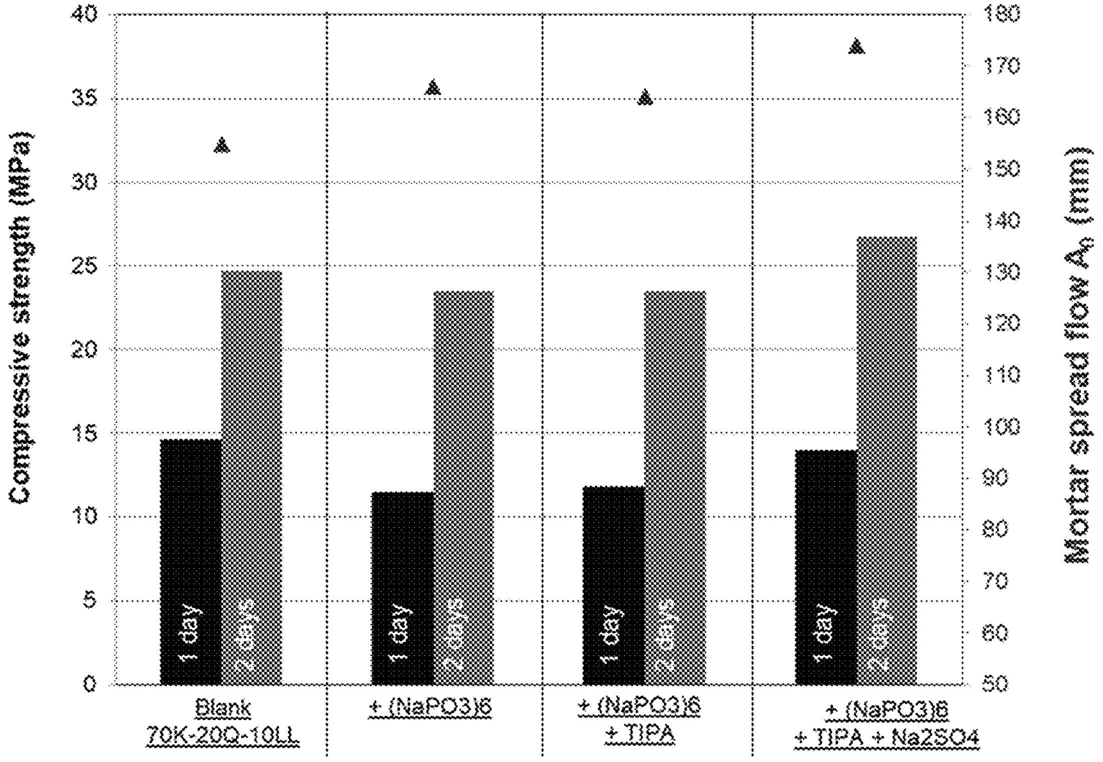
Compressive strength (MPa)
Mortar spread flow $A_0$ (mm)
0
5
10
15
20
25
30
35
40
50
60
70
80
90
100
110
120
130
140
150
160
170
180
1 day
2 days
Blank
70K-20Q-10LL
+ (NaPO3)6
+ (NaPO3)6
+ TIPA
+ (NaPO3)6
+ TIPA + Na2SO4

PERFORMANCE ENHANCER FOR COMPOSITE CEMENTS

CROSS REFERENCE TO RELATED APPLICATIONS

This application is the National Stage of PCT/EP2022/067660 filed on Jun. 28, 2022, which claims priority under 35 U.S.C. § 119 of European Application No. 21183139.1 filed on Jul. 1, 2021, the disclosure of which is incorporated by reference. The international application under PCT article 21 (2) was published in English.

The present invention relates to an enhancer composition comprising polyphosphates, amines and inorganic sulfate compounds, the use of such compositions, hydraulic binders containing them, and to a method for enhancing workability and/or strength development of hydraulic binders.

Cement, and especially Portland cement-abbreviated OPC in the following, is an important construction material on the one hand, but one that requires large amounts of energy and mineral raw materials to produce on the other hand. Hence, there have been efforts for some time to reduce the energy and raw material needs, for example by using by-products and waste products.

Substituting Portland cement clinkers with supplementary cementitious materials—SCMs in the following—is especially well-suited for achieving these goals. On the one hand, SCMs are frequently by-products and waste products and therefore reduce the raw material input. On the other hand, lowering the clinker content in turn lowers the energy requirement for the production thereof, because SCMs require less energy to produce than clinkers.

The most commonly used SCMs include ground granulated blast furnace slag and fly ash. In addition, natural pozzolans and calcined clays are often used and recently also carbonated recycled concrete fines. However, not all slags, ashes, clays etc. are suitable as SCMs. The pozzolanic or latent hydraulic reactivity may not be too low, as otherwise the properties of the construction material created from the cement and SCM will be negatively impacted. For example, calcined clay can only be used as an SCM if it has a minimum content of suitable clay minerals. The aluminium oxide content and the $Al_2O_3/SiO_2$ ratio should be high. Moreover, the effect of replacing clinker with SCM is usually a slower strength development, i.e. early strength decreases.

The same applies for the substitution of OPC by fillers like limestone. Portland-limestone cements are widely used in many parts of the world including Europe where they are classified according to EN 197-1:2000 as CEM II/A-L or CEM II/A-LL, which apart from clinker as the main constituent can contain up to 20% by weight limestone, or CEM II/B-L CEM II/B-LL cements, which apart from clinker can contain up to 35% by weight limestone. Typically, such cements have lower strengths since limestone does more or less not react.

Another problem can arise when SCM and/or fillers are (very) fine and/or have a high surface. Such additions require more water to achieve the same workability, measured e.g. as slump. More water is generally associated with lower strength. To maintain a desired low water/cement (or water/binder) ratio, water reducing admixtures are most commonly added. SCMs and fillers like clay and limestone often are highly absorptive and/or very fine, so that a large volume of water reducing admixture is needed for concrete made out of such composite cements in order to compensate for the increased water demand. Admixtures can also be ad- and absorbed on the surface and in the clay interlayers, respectively, which makes it necessary to use even larger amounts.

Numerous proposals are found in the prior art to deal with the problems of high water demand and insufficient strength development. Some examples are mentioned in the following.

U.S. Pat. No. 6,221,148 B1 relates to a method of making a highly reactive pozzolan from metakaolin. One step of the method is forming a slurry comprising metakaolin. It is possible to add a dispersant to the slurry. Inter alia inorganic phosphate based dispersants are listed. However, the pozzolan is obtained by milling the slurry and then separating the ground metakaolin from the slurry.

US 2017/0267586 A1 discloses a process for the production of SCM by co-calcining clay and dolomite to provide calcined clays that allow both suitable strength development and have acceptable water demand. Use of grinding aids, inter alia alkanolamines, is mentioned for grinding. Further, setting and/or hardening accelerators are mentioned, wherein alkaline salts and especially $Na_2SO_4$ and $K_2SO_4$ are listed. EP 3 248 952 relates to a similar method for producing a supplementary cementitious material. The gist of this document is to produce less coloured SCM by co-calcining clay and dolomite under reducing conditions.

U.S. Pat. No. 8,317,916 B1 discloses a zinc-oxide based set retardant for cement. Retarders based inter alia on salts of phosphoric acid, poly phosphoric acid, or phosphonic acid are described as known but undesirable.

EP 2 226 363 A1 relates to clay activation by acid treatment and calcining. Both phosphoric and sulfuric acid are mentioned as acid.

Y. Zhang et al, "Effect of sodium hexametaphosphate and trisodium phosphate on dispersion of polycarboxylate superplasticizer", doi: 10.3390/ma122441190, indicates that polyphosphates, such as sodium tripolyphosphate and sodium hexametaphosphate, promote the dispersion ability and dispersion retention ability of superplasticizer systems.

To sum up, many property enhancers for cements and other methods to improve properties are described in the art. However, there is still a demand to improve both the compressive strength development and the workability of cements comprising high water demand SCM and/or filler.

Accordingly, it is an object of the invention to overcome these disadvantages. In particular, it is an object of the invention to provide an enhancer for composite cements, which overcomes at least some of the aforementioned disadvantages. In particular, the compositions should improve both the strength development as well as the flow of the cement.

The invention is based on the surprising finding that a mixture of polyphosphates, amines and inorganic sulfate compounds improves the properties of composite cements. In particular, it was found that composite cements comprising the enhancer composition according to the invention satisfy the requirements described above. The composition offers the advantage of significantly improved performance.

Therefore, in a first aspect the invention relates to compositions comprising a) from 5 to 50% by weight, based on the total weight of the composition, of at least one polyphosphate compound, b) at least one amine and c) at least one inorganic sulfate compound.

In a preferred embodiment the invention relates to compositions for enhancing the workability and strength development of hydraulic binders containing high water demand supplementary cementitious materials, the compositions comprising a) from 5 to 50% by weight, based on the total weight of the composition, of at least one polyphosphate compound, b) at least one amine and c) at least one inorganic sulfate compound.

The invention further relates to a use of the composition as defined above and below for enhancing strength development and/or workability of hydraulic binders comprising at least one supplementary cementitious material with high water demand.

The invention further relates to a hydraulic binder comprising a hydraulic cement, at least one supplementary cementitious material with high water demand and/or filler with high water demand and a composition as defined above and below.

The invention further relates to a method for manufacturing a hydraulic binder as defined above and below comprising the steps i) providing a hydraulic cement and a supplementary cementitious material with high water demand and/or a filler with high water demand or a composite cement comprising a high water demand supplementary cementitious material and/or filler,
ii) providing a composition as defined above and below,
iii) blending or intergrinding the composition with at least one of the supplementary cementitious material and/or filler and the cement and blending or intergrinding the supplementary cementitious material and/or a filler and the cement to provide the hydraulic binder or blending or intergrinding the composition with the composite cement to provide the hydraulic binder.

The invention further relates to a use of the binder as defined above and below for making hydraulic building materials, preferably mortar or concrete.

The invention also relates to an SCM comprising a high water demand calcined clay and/or carbonated concrete fines and the composition according to the invention as defined above and below, preferably in an amount sufficient to adjust the water demand and early strength to the level shown by a composite cement with the same clinker replacement amount with a standard SCM, in particular granulated blast furnace slag (GBFS) having an activity index of ≥0.85, determined according to DIN EN 15167-1.

The composition according to the invention and the special embodiments thereof described hereinafter are advantageous with respect to one or more of the following points:

- A synergy effect is observed in the mechanical performance at early ages. The strength of the hydraulic binder is increased by ca. 10% compared to a hydraulic binder without the composition according to the invention.
- The hydraulic binder is also characterized by a normal water demand. In other words the workability is increased over binders without the composition. Typically, the mortar flow is increased by at least 15 mm (DIN EN 196-1, DIN EN 206-1/DIN 1045-2).
- The dosage is done with respect to the high water demand component, i.e. supplementary cementitious material and/or filler. Dosing is easy by pre-blending the composition with this component in the correct amount.

To simplify the description the following abbreviations that are usual in the field of cement are used herein: H—$H_2O$, C—CaO, A—$Al_2O_3$, F—$Fe_2O_3$, M—MgO, N—$Na_2O$, K—$K_2O$, S—$SiO_2$ and $-$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

The term "reactive" shall mean a hydraulic reactivity unless specified otherwise. Hydraulic reactivity designates the reaction of a compound with water or other water containing compounds to form hydrated phases including a reaction of two or more compounds occurring simultaneously.

In the context of the invention cement is used to designate a material that, after mixing with water to form a paste, is able to develop mechanical strength by hydraulic reaction. Thus, cement denotes a ground clinker or analogous hydraulic phases obtained by other routes like dicalcium silicate cement obtained by hydrothermal treatment. Binder or binder mixture means a material or mixture containing cement and developing mechanical strength by a hydraulic reaction with water, wherein the binder typically but not necessarily contains more components than the cement. Thus, geopolymer binder, super sulphated cement and composite cements are termed binder herein. A binder is used adding water or another liquid and mostly also aggregates as well as optionally admixtures and/or additives, to provide a paste that hardens resulting in a building element. Therefore, paste herein means a mixture of binder with water, especially but not limited to concrete and mortar.

A supplementary cementitious material (SCM) is herein defined as a pozzolanic and/or latent hydraulic material useful to replace a part of the cement in a binder. Latent hydraulic materials have a composition that allows hydraulic reaction upon contact with water, wherein typically an activator is needed to enable hardening within technically feasible times. Activator means a substance that accelerates the hardening of latent hydraulic materials. It can be an additive like a sulfate or calcium (hydr) oxide and/or products of the hydraulic reaction of the ground clinker, e.g. calcium silicates that liberate calcium hydroxide during hydration. Pozzolanic materials are characterized by a content of reactive silica and/or alumina which form strength providing calcium silicate hydrates and calcium aluminate hydrates, respectively, during hydration of the clinker together with the calcium hydroxides liberated. In practice the boundary between latent hydraulic and pozzolanic materials is not clearly defined, for example fly ashes can be both, latent hydraulic and pozzolanic, depending on their calcium oxide content. Consequently, the term SCM designates both, latent hydraulic as well as pozzolanic materials. However, not reactive or only slightly reactive materials like limestone that substantially do not take part in the hydraulic reaction have to be clearly differentiated from SCM, with which they are sometimes summarized as mineral additions. Fillers can enhance the strength development and workability by acting as seed and/or improving the particle packing density.

The term "standard SCM" refers to materials that, when used with Portland cement, contribute to the properties of the hardened concrete through hydraulic or pozzolanic activity or both. Standard SCM is preferably selected from fly ash, ground granulated blast furnace slag (GGBFS) and silica fume, in particular standard SCM is granulated blast furnace slag, especially, wherein the granulated blast furnace slag has an activity index of ≥0.85, determined according to DIN EN 15167-1.

Hydraulically hardening building material means a wet mixture that is able to harden hydraulically, and comprises a cement or binder as well as optionally any other addition contained to adjust the properties like final strength, processability of the wet mixture and strength development properties, to the intended use of the building material. For example, a concrete used to build a bridge needs other properties than a screed for casting a floor or a mortar for laying bricks.

Building structure denotes the hardened building material, e.g. a pre-cast concrete element or a floor or a bridge part from cast on-site concrete.

Enhancer composition in the sense of the invention are compositions capable to improve the performance of the hydraulic binder. That means such compositions optimize the workability and compressive strength of hydraulic binders.

The composition according to the present invention comprises three essential components, namely a polyphosphate, an amine, and an inorganic sulfate compound. Each of the three components can be a mixture of two or more of its kind of component, independently from the others. In other words one, two or all three of the polyphosphate, amine, and inorganic sulfate compound can be a mixture of polyphosphates, amines, inorganic sulfate compounds, respectively.

The composition can consist of the three components/component mixtures, or comprise further substances. For example, but not limited to, it can be a solution in water and/or comprise further admixtures and/or additives known for use in hydraulic building materials like concrete.

Component a) is at least one polyphosphate. Polyphosphates in the sense of the invention are condensation products of ortho-phosphoric acid ($H_3PO_4$). The structural units are linked together by sharing oxygen atoms. Polyphosphates can adopt linear or cyclic structures. The term polyphosphate in the sense of the invention includes also short-chain phosphates (i.e. those often referred to as oligo phosphates). The number of phosphate units n is in the range from 2 to 500, preferably 3 to 100, most preferably from 3 to 15.

The counter ions of the phosphates are not crucial. Thus, the counter ion may be any ion that compensates the charge of the phosphate anion. Suitable counter ions are selected from ammonium, sodium and potassium, preferred are sodium and potassium.

Preferred linear polyphosphates are selected from diphosphate, triphosphate, tetraphosphate, hexaphosphate, and mixtures thereof.

Preferred cyclic polyphosphates are metaphosphates, particularly preferred are trimetaphosphate and hexametaphosphate.

In a preferred embodiment a) is methaphosphate, in particular sodium hexametaphosphate.

The amount of components a) ranges from 5 to 50% by weight, based on the total weight of the composition, the preferred amount of component a) ranges from 10% by weight to 50% by weight, in particular from 20% by weight to 40% by weight, based on total weight of the composition.

Component b) is at least one amine. Preferably b) is at least one compound of general formula (I)

(I)

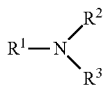

wherein $R^1$, $R^2$ and $R^3$ are independently from each other selected from H, $C_1$-$C_6$-alkyl and $C_1$-$C_6$-alkyl alkanol comprising 1, 2, or 3 OH groups, their salts, esters or mixtures thereof, with the proviso that at least one of $R^1$, $R^2$ and $R^3$ is not H.

In the context of the invention, the expression $C_1$-$C_6$-alkyl refers to unbranched or branched saturated hydrocarbon groups having 1 to 6 carbon atoms. $C_1$ $C_6$-alkyl are e.g. methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl. $C_1$-$C_4$-alkyl refers e.g., but not exclusively, to methyl, ethyl, propyl, 1-methylethyl, butyl, 1-methylpropyl, 2-methylpropyl or 1,1-dimethylethyl.

In the context of the invention the expression alkanol refers to alkyl, wherein one or more hydrogen atoms, for example 1, 2 or 3 hydrogen atoms, bonded to one or more carbon atoms of the alkyl are replaced by a hydroxyl group.

Component b) is preferably selected from compounds of formula (I), wherein $R^1$, $R^2$ and $R^3$ are $C_1$-$C_6$-alkanol. More preferably they are compounds, wherein $R^1$, $R^2$ and $R^3$ are independently from each other selected from $CH_2CH_2OH$, $CH_2CH_2CH_2OH$, $CH_2CH(CH_3)OH$, $CH_2CH_2CH_2CH_2OH$, $CH(OH)CH(CH_3)_2$, $CH(CH_3)CH(CH_3)OH$, and mixtures thereof.

In a preferred embodiment at least two of $R^1$, $R^2$ and $R^3$ have the same meaning.

Preferred compounds are monoethanolamine (MEA) and diglycolamine (DGA), secondary amines like diethanolamine (DEA) and diisopropanolamine (DIPA), and tertiary amines like methyldiethanolamine (MDEA), triisopropanolamine (TIPA), and triethanolamine (TEA), but not limited to. Particularly preferred as compound b) are triisopropanolamine (TIPA).

The alkanolamine may also be present as a salt or ester of an organic acid. Preferred acids are carboxylic acids with 1 to 16 C atoms, in particular formic acid, acetic acid, prop-2-ene acid, 2-methylpropene acid, citric acid, fatty acid, tartaric acid and oxalic acid.

The preferred amount of component b) ranges from 5% by weight to 25% by weight, in particular from 10% by weight to 20% by weight, based on the total weight of the composition.

The third essential component is an inorganic sulfate compound, i.e. a source of sulfate ions. The term sulfate ions does not cover hydrogen sulfate in the context of the present invention.

In a first preferred embodiment c) is at least one sulfate salt selected from ammonium salt, alkali metal salt, alkaline earth metal salt and mixtures thereof. Preferably, the inorganic sulfate compound c) is an alkali or earth alkali sulfate, especially sodium and/or potassium sulfate. The inorganic sulfate compound is preferably selected from ammonium sulfates, alkali metal sulfates, alkaline earth metal sulfates, cement kiln dust, flue gas desulfurisation wastes, residues from the production of sodium carbonate, highly alkaline chromite ore processing residue, and mixtures thereof.

In a second preferred embodiment component c) is a by-product or waste material containing sulfate, preferably cement kiln dust. Cement kiln dust—CKD in the following—is a fine grained, solid, highly alkaline particulate material chiefly composed of oxidized, anhydrous, micron-sized particles collected from electrostatic precipitators during the production of cement clinker. CKD consists of four major components: unreacted raw feed, partially calcined feed and clinker dust, free lime, and enriched salts of alkali sulfates, halides, and other volatile compounds. The kiln dust suitable for utilization in the present invention is preferably obtained from the clinkering process utilized in the preparation of portland cement. Typical chemical compositions of cement kiln dust are known by the skilled person and are described e.g. in F. W. Locher, "Zement", Verlag Bau+Technik GmbH, 2000, pages 120 to 145. Other preferred waste materials are residues from flue gas desulfurization, for example but not limited to, using wet scrubbing, spray-dry scrubbing and dry sorbent injection. Commonly, flue gas desulfurization is applied to the exhaust gas of fossil-fuel power plants and to the emissions of other sulfur oxide emitting processes such as waste incineration. The spent sorbent from flue gas desulfurization is a useful. Further preferred waste materials are residues from sodium carbonate production with the Solvay process. Also, residues from processing highly alkaline chromite ore in the obsolete high lime process or other ore processings methods is useful.

In a third preferred embodiment the inorganic sulfate compound c) is a mixture of two or more of the aforementioned, most preferred an ammonium sulfate, an alkali metal sulfate, earth alkali metal sulfate, cement kiln dust or a mixture of two or more thereof.

The preferred amount of component c) calculated as $SO_3$ ranges from 35% by weight to 85% by weight, in particular from 45% by weight to 70% by weight, based on the total weight of the composition.

Preferably, the weight ratio of a):b):c) in the composition is in the range from 1:0.5:2 to 3:3:20, preferably from 1.5:0.7:6 to 2.5:1.4:10.

In a preferred embodiment the composition according to the invention comprises:

5 or 10% by weight to 50% by weight polyphosphate a), in particular, meta-phosphate, especially hexametaphosphate, based on the sum of a), b) and c), 5% by weight to 25% by weight component b), in particular alkanolamine, especially tiisopropropanolamine, based on the sum of a), b) and c), 35% by weight to 85% by weight inorganic sulfate compound c), in particular an alkali sulfate and/or CKD, especially sodium sulfate, based on the sum of a), b) and c).

A further embodiment of the invention is a hydraulic binder comprising a hydraulic cement, at least one supplementary cementitious material or filler with high water demand and a composition according to the invention.

Suitable hydraulic cements include, but are not limited to, Portland cement, calcium sulfoaluminate cement, calcium aluminate cement and dicalcium silicate cement. There can be more than one SCM present so that the cement can also be a Portland composite cement, especially selected from Portland slag cement, Portland silica fume cement, Portland pozzolanic cement, Portland fly ash cement, Portland slate cement, and Portland limestone cement, or a slag cement, especially a blast furnace slag cement, or a pozzolanic cement. Preferred are cements according to EN 197, in particular Portland cements and Portland composite cements as well as non-standard cements with alite, belite, calcium aluminate and/or calcium sulfoaluminate as main reactive phases.

High water demand SCMs are in particular calcined clays and carbonated recycled concrete fines. However, also some natural pozzolans as well as ashes and slags can cause a high water demand. The present invention advantageously renders such SCMs useful. For clays it becomes possible to use lower burning temperature, reducing the risk of sintering clay minerals into unreactive compounds and reducing energy consumption. Without the composition according to the invention higher temperatures were essential to reduce the surface sufficiently. In the case of carbonated recycled concrete fines the invention allows a use of materials with less than optimal carbonation degree. Again, carbonated recycled concrete fines or at least partially carbonated recycled concrete fines and especially those with not optimal carbonation have a too high water demand otherwise.

In one embodiment the hydraulic binder according to the invention contains a filler, preferably in addition to the SCM. A filler is inert, e.g. not reactive or only slightly reactive in the hydraulic reaction. The filler is preferably selected from ground minerals like limestone, dolomite, quarry dust and mixtures thereof, in particular limestone. Other inorganic materials of similar chemical composition, especially by-products and waste materials, are also possible. Many fillers are fine or even very fine materials to perform as seed nuclei and/or optimize the particle packing density on the fine side. Such fillers often have a high water demand. Then, the composition according to the invention allows their use or bigger amounts of them without substantially increasing the water demand of the binder.

The composition according to the invention can be added to the binder or to one of its components. In one embodiment the composition is added to the SCM and/or filler with high water demand. Its dosage is typically based on the amount of high water demand cement component. In contrast, usual admixtures are typically dosed with respect to the cement. Preferably, the amount of enhancer composition ranges from 0.2 to 6% by weight of the high water demand component, more preferred from 0.4 to 3.5% by weight, most preferred from 0.8 to 2% by weight.

The preferred amount of component a) ranges from 0.05% by weight to 0.5% by weight, in particular from 0.15% by weight to 0.30% by weight, based on the total weight of binder.

The preferred amount of component b) ranges from 0.02% by weight to 0.30% by weight, in particular from 0.05% by weight to 0.20% by weight, based on the total weight of binder.

The preferred amount of component c) calculated as $SO_3$ ranges from 0.05% by weight to 1.50% by weight, in particular from 0.15% by weight to 0.50% by weight, based on the total weight of binder.

In a preferred embodiment the hydraulic binder comprises the composition according to the invention, wherein the composition comprises:

0.05% by weight to 0.50% by weight polyphosphate a), in particular, meta-phosphate, especially hexametaphosphate, based of the total weight of the hydraulic binder, 0.02% by weight to 0.30% by weight component b), in particular alkanolamine, especially tiisopropropanolamine, based on the total weight of the hydraulic binder, 0.05% by weight to 1.50% by weight inorganic sulfate compound c), in particular an alkali sulfate and/or CKD, especially sodium sulfate, based of the total weight of the hydraulic binder.

The hydraulic binder according to the invention can also comprise admixtures and/or additives known per se when those are dry materials. Suitable admixtures and additives are described below.

In one embodiment the hydraulic binder comprises from 10 to 70% by weight hydraulic cement, from 90 to 30% by weight supplementary cementitious material and/or filler and 0.1 to 3% by weight composition as defined above, all based on the total weight of the hydraulic binder. Therein, the sum of all components contained is 100%, taking into account that from 0.1 to 0.4% composition together with 10% cement and 90% SCM and/or filler as well as together with 70% cement and 30% SCM and/or filler still sum up to 100%. Preferably the hydraulic binder according to the invention comprises 50 to 84.9% by weight cement as defined above, based on the total weight of the hydraulic binder, 5 to 50% by weight supplementary cementitious material as defined above, based on the total weight of the hydraulic binder, 5 to 50% by weight filler as defined above, based on the total weight of the hydraulic binder, 5 to 50% by weight composition according to the invention as defined above, based on the total weight of the hydraulic binder 0.1 to 3.0% by weight further admixtures other than the composition based on the total weight of the hydraulic binder and 0 to 30% by weight further additives other than filler, based on the total weight of the hydraulic binder.

For use the hydraulic binder is processed e.g. into mortar or concrete by mixing with water. Typically, a water:binder weight ratio (w/b) from 1 to 0.1, preferably from 0.75 to 0.15 and most preferred from 0.65 to 0.35 is used. The SCM and/or filler present are included into the amount of binder for calculating the w/b.

The mortar or concrete usually also contains aggregate as well as optionally other admixtures and/or additives apart from the composition according to the invention.

Aggregate can be any aggregate known as such. Normally sand and/or gravel of selected particle sizes is/are used. In some embodiments lightweight aggregate is used, typically as part of the aggregate but also as sole aggregate. Recycled aggregate and/or synthetic aggregate is also useful, both alone and in mixture with natural sand and/or gravel.

Admixtures are used to optimize the properties of the paste like setting time, hardening time, spread, viscosity and homogeneity as well as to impart desired properties to the final concrete part like strength, flexural modulus, freeze-thaw-resistance and many more. These admixtures are known per se and are used in their usual amounts. Admixtures like water reducing agents, plasticizers and super plasticizers to adjust consistency while keeping the w/b in the suitable range are preferred admixtures. Useful water reducing agents, plasticizers and super plasticizers are for example, but not exclusively, organic compounds with one or more functional group selected from carboxylate, sulfonate, phosphonate, phosphate or alcohol functional groups. Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acid and their salts, phosphonates, sugars (saccharides). Furthermore, it is possible to use admixtures that improve the concrete durability performance like air entrains or hydrophobic agents. Admixtures can also be added to the binder, if they are dry substances.

Often, also additives are contained. Usually, these are glass fibres, polymer fibres, silica fume, pigments, for example. One or more of them can be used in the usual amount. Additives are often added to the binder, since most of them are dry substances.

A further embodiment of the present invention is a method for the manufacturing of a hydraulic binder as defined above, comprising the steps i) providing a cement and a high water demand supplementary cementitious material and/or filler or a composite cement containing a high water demand SCM and/or filler ii) providing a composition according to the invention as defined above, iii) blending or intergrinding the composition with at least one of the cement, the SCM and/or filler or blending or intergrinding the composition with the composite cement to provide the hydraulic binder.

Preferably, the hydraulic binder comprises from 10 to 70% by weight hydraulic cement, from 90 to 30% by weight supplementary cementitious material and/or filler and 0.1 to 3% by weight compositions.

Known procedures and devices are useful for the method. The method may comprise the further step of blending the cement, the SCM, the filler, the composite cement or the binder with an admixture and/or an additive.

A further embodiment of the invention is the use of the hydraulic binder as defined above for making hydraulic building materials, preferably mortar or concrete. Herein, the binder is mixed with water, preferably in a w/b ratio from 0.1 to 1, more preferred from 0.15 to 0.75, most preferred from 0.35 to 0.65. Usually, aggregate is added, typically sand and/or gravel depending on the kind of building material. Recycled aggregate, light weight aggregate and synthetic aggregate can also be used alone or in mixture with the common natural aggregate.

The hydraulic binder according to the invention is suitable for all uses where OPC and known composite cements are useful. It shows a normal setting and hardening and conforms to the usual strength requirements. For example, it may be used for ready mix concrete, on-site concrete, mortar, and construction chemical compositions like floor screed or tile adhesive. Since it maintains a similar early strength development as OPC it is especially useful for making precast concrete parts and elements like slabs, pavement, panels, beams, road parts, walls, ceilings, and floors.

A further embodiment of the invention is a hydraulic building material such as concrete or mortar comprising the composition according to the invention or hydraulic binder as defined above.

Still another embodiment of the present invention is an SCM comprising a high water demand calcined clay and/or carbonated concrete fines and the composition according to the invention as defined above. The amount should be sufficient to adjust the water demand and early strength to the level shown by a composite cement with the same clinker replacement amount with standard SCM, in particuar granulated blast furnace slag, having an activity index of ≥0.85, determined according to DIN EN 15167-1.

Yet another embodiment of the present invention is a use of the composition according to the invention to enhance workability and/or strength development of binders comprising a hydraulic cement and a high water demand supplementary cementitious material and/or filler. Enhancing workability means the water demand of the binder corresponds to such of binders from composite cements not containing high water demand SCMs and/or filler. Or with other words, the slump of the binder conforms to standard requirements. Enhancing strength development means that the strength measured according to EN 196-1 after 7 days, preferably after 2 days and most preferred after 1 day conforms to the strength of binders from composite cements not containing high water demand SCMs and/or filler, i.e. to standard requirements. When workability and/or strength can be lower than standard requirements, the enhancer composition allows a higher clinker replacement level than previously used admixtures and substances.

BRIEF DESCRIPTION OF THE DRAWING

The invention will be illustrated further with reference to the examples and figure that follow, without restricting the scope to the specific embodiments described. The invention includes all combinations of described and especially of preferred features that do not exclude each other.

FIG. 1 shows the measured strength and flow of the mortar of Example 1.

If not otherwise specified, any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

EXAMPLE 1

Procedure to Obtain the Presented Experimental Results:

A ternary cement containing 70 wt.-% Portland cement clinker and gypsum, 20 wt.-% calcined clay and 10 wt.-% limestone was made by blending the components together.

Standard mortar was made acc. to EN 196-1 consisting of 450 g of cement and 225 g of water. The mixture was first made without chemical additives (blank). Mortar spread flow was measured on the fresh mortar. Strength at 1 and 2 days was measured according to EN 196-1 on mortar prisms. The experiment was then repeated adding the compounds indicated in table 1 to the mixing water. Similarly, mortar spread flow was measured on the fresh mortars cast with the added additives. Strength at 1 and 2 days was additionally measured.

TABLE 1

| Mixture | | Quantity of additive |
|---|---|---|
| 1 (comparative) | Cement (blank) | |
| 2 (comparative) | Cement/$(NaPO_3)_6$ | $(NaPO_3)_6$: 0.9 g |
| 3 (comparative) | Cement/$(NaPO_3)_6$/TIPA*) | $(NaPO_3)_6$: 0.9 g<br>TIPA: 0.45 g |
| 4 (inventive) | Cement/$(NaPO_3)_6$/TIPA/$Na_2SO_4$ | $(NaPO_3)_6$: 0.9 g<br>TIPA: 0.45 g<br>$Na_2SO_4$: 2.25 g |

*)triisopropanolamine

The measured strength and flow are shown in FIG. 1. The columns represent the measured strengths and the triangles the measured flow. It is readily apparent that only mixture 4 shows both an increased compressive strength and an improved workability flow (mortar flow). While an addition of polyphosphate alone is able to improve flow in mixture 2 it reduces strength development. This cannot be remedied by adding an alkanolamine as seen for mixture 3.

The invention claimed is:

1. A hydraulic binder comprising
a hydraulic cement,
a supplementary cementitious material with high water demand being carbonated recycled concrete fines
and a composition comprising
a) from 5 to 50% by weight, based on the total weight of the composition, of at least one polyphosphate,
b) from 5 to 25% by weight, based on the total weight of the composition, of at least one amine of general formula (I)

(I)

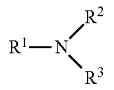

wherein $R^1$, $R^2$ and $R^3$ are independently from each other selected from H, $C_1$-$C_6$-alkyl and $C_1$-$C_6$-alkyl alkanol comprising 1, 2, or 3 OH groups, their salts, esters or mixtures thereof, with the proviso that at least one of $R^1$, $R^2$ and $R^3$ is not H, c) from 35% by weight to 85% by weight calculated as $SO_3$, based on the total weight of the composition, of at least one inorganic sulfate compound, wherein the weight ratio of a): b): c) in the composition is in the range from 1:0.5:2 to 3:3:20.

2. A hydraulic binder according to claim 1,
wherein the binder comprises
0.05% by weight to 0.5% by weight component a) based on the total weight of the hydraulic binder,
0.02% by weight to 0.3% by weight component b), based on the total weight on the hydraulic binder,
0.05% by weight to 1.5% by weight component c), calculated as $SO_3$, based on the total weight of the hydraulic binder.

3. A method for manufacturing a hydraulic binder comprising the steps
i) providing a hydraulic cement and a supplementary cementitious material with high water demand being carbonated recycled concrete fines or providing a composite cement comprising a high water demand supplementary cementitious material being carbonated recycled concrete fines,
ii) providing a composition comprising
a) from 5 to 50% by weight, based on the total weight of the composition, of at least one polyphosphate,
b) from 5 to 25% by weight, based on the total weight of the composition, of at least one amine of general formula (I)

(I)

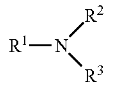

wherein $R^1$, $R^2$ and $R^3$ are independently from each other selected from H, $C_1$-$C_6$-alkyl and $C_1$-$C_6$-alkyl alkanol comprising 1, 2, or 3 OH groups, their salts, esters or mixtures thereof, with the proviso that at least one of $R^1$, $R^2$ and $R^3$ is not H, c) from 35% by weight to 85% by weight calculated as $SO_3$, based on the total weight of the composition, of at least one inorganic sulfate compound, wherein the weight ratio of a): b): c) in the composition is in the range from 1:0.5:2 to 3:3:20, iii) blending or intergrinding the composition with at least one of the supplementary cementitious material and the cement and blending or intergrinding the supplementary cementitious material and the cement to provide the hydraulic binder or blending or intergrinding the composition with the composite cement to provide the hydraulic binder.

4. The method according to claim 3, wherein the binder comprises from 10 to 70% by weight hydraulic cement, from 90 to 30% by weight supplementary cementitious material being carbonated recycled concrete fines, and 0.1 to 3% by weight of the composition.

5. The method of claim 3, wherein the composition comprises

10% by weight to 50% by weight component a),

10% by weight to 20% by weight component b),

45% by weight to 70% by weight component c) calculated as $SO_3$, based on the total weight of the composition.

6. The binder according to claim 1, wherein the composition comprises

10% by weight to 50% by weight component a),

10% by weight to 20% by weight component b),

45% by weight to 70% by weight component c) calculated as $SO_3$, based on the total weight of the composition.

7. The binder according to claim 2, wherein the composition comprises

10% by weight to 50% by weight component a),

10% by weight to 20% by weight component b),

45% by weight to 70% by weight component c) calculated as $SO_3$, based on the total weight of the composition.

8. The binder according to claim 1, wherein component a) of the composition is a linear or cyclic polyphosphate with a number of phosphate units ranging from 2 to 100 and/or component c) is alkali sulfate, cement kiln dust, or a mixture thereof, and/or at least two of $R^1$, $R^2$ and $R^3$ are $C_1$-$C_4$-alkanol.

9. The method according to claim 4, wherein component a) of the composition is a linear or cyclic polyphosphate with a number of phosphate units ranging from 2 to 100 and/or component c) is alkali sulfate, cement kiln dust, or a mixture thereof, and/or at least two of $R^1$, $R^2$ and $R^3$ are $C_1$-$C_4$-alkanol.

* * * * *